(12) United States Patent
Yoshioka

(10) Patent No.: US 6,196,289 B1
(45) Date of Patent: Mar. 6, 2001

(54) RUN-FLAT TIRE

(75) Inventor: Tetsuhiko Yoshioka, Kobe (JP)

(73) Assignee: Sumitomo Rubber Industries, Ltd., Hyogo-Ken (JP)

( * ) Notice: Subject to any disclaimer, the term of this patent is extended or adjusted under 35 U.S.C. 154(b) by 0 days.

(21) Appl. No.: 09/391,672

(22) Filed: Sep. 8, 1999

(30) Foreign Application Priority Data

Sep. 8, 1998 (JP) .................................................. 10-254243

(51) Int. Cl.$^7$ ............................ B60C 15/00; B60C 17/00
(52) U.S. Cl. ............................................. 152/517; 152/554
(58) Field of Search ...................................... 152/517, 554

(56) References Cited

U.S. PATENT DOCUMENTS 5,871,602 * 2/1999 Paonessa et al. ..................... 152/517

* cited by examiner

Primary Examiner—Adrienne C. Johnstone

(74) Attorney, Agent, or Firm—Birch, Stewart, Kolasch & Birch, LLP

(57) ABSTRACT

A run-flat tire comprises a carcass composed of an inner ply and an outer ply each made of organic fiber cords, a belt disposed radially outside the carcass in the tread portion, and three sidewall reinforcing rubber layers disposed in each sidewall portion. The inner and outer carcass plies are turned up around the bead cores from the inside to the outside of the tire, and the turnup portions of the inner carcass ply extends into between the belt and the carcass so that the radially outer end thereof is secured therebetween. The sidewall reinforcing layers include: an inside layer disposed axially inside the main portion of the inner ply; a middle layer disposed between the main portion of the inner ply and the main portion of the outer ply; and an outside layer disposed axially outside the main portion of the outer ply. At least one of the sidewall reinforcing rubber layers has a radially outer end located beneath the belt. At least one of the sidewall reinforcing rubber layers has a radially inner end located radially outward of the bead core but radially inward of a maximum tire section width point. At the maximum tire section width point, the total of the thicknesses of the inside layer, middle layer and outside layer is not less than 50% of the total thickness of the sidewall portion.

6 Claims, 4 Drawing Sheets

RUN-FLAT TIRE

TECHNICAL FIELD

The present invention relates to a pneumatic tire, more particularly to a run-flat tire having an improved sidewall reinforcing structure.

BACKGROUND OF THE INVENTION

In order to improve run-flat performance such as runable distance of a pneumatic tire, as shown in FIG. 4, a tire which has a sidewall portion (s) reinforced with a relatively thick rubber layer (g) has been proposed, wherein this thick rubber layer (g) is disposed on the axially inside of the carcass to extend along the inside of the tire.

In this reinforcing structure, however, under run-flat conditions, damage starting from a carcass ply turnup edge (f1) is liable to occur when the edge (f1) is positioned in the sidewall portion, especially it is positioned around the maximum tire section width point. Further, the rubber layer (g) has a maximum thickness at the maximum tire section width point. Under flat conditions, however, bending deformation becomes larger in the tire shoulder portion than the maximum tire section width portion. In other words, the bending deformation concentrates on the shoulder portion. Thus, in this structure, the tire has a tendency to have a week point in the shoulder portion.

Such drawbacks may be eliminated by for example covering the edge (f1) with an additional carcass ply and increasing the thickness of the rubber layer (g). However, other problems such as an increase in the tire weight and deterioration of ride comfort and dynamic performance under normal conditions, arise.

SUMMARY OF THE INVENTION

It is therefore, an object of the present invention to provide a run-flat tire improved in run-flat performance, e.g. runable distance, durability and the like without increasing the tire weight and deteriorating running performance under normal conditions.

According to one aspect of the present invention a run-flat tire comprises
 a tread portion,
 a pair of sidewall portions,
 a pair of bead portions with a bead core therein,
 a carcass comprising an inner ply and an outer ply each made of organic fiber cords,
 a belt disposed radially outside the carcass in the tread portion,
 sidewall reinforcing rubber layers disposed in each said sidewall portion,
 each of the inner ply and outer ply extending between the bead portions through the tread portion and sidewall portions and turned up around the bead core in each bead portion from the inside to the outside of the tire to form a pair of turnup portion and a main portion therebetween,
 the turnup portions of the inner ply extended into between the belt and the carcass and each having a radially outer end secured therebetween,
 the sidewall reinforcing rubber layers including:
   an inside layer disposed axially inside the main portion of the inner ply;
   a middle layer disposed between the main portion of the inner ply and the main portion of the outer ply; and
   an outside layer disposed axially outside the main portion of the outer ply,
 at least one of the sidewall reinforce rubber layers having a radially outer end located beneath the belt,
 at least one of the sidewall reinforce rubber layers having a radially inner end located radially outward of the bead core but radially inward of a maximum tire section width point,
 at the maximum tire section width point, the total of the thicknesses of the inside layer, middle layer and outside layer being not less than 50% of the thickness of the sidewall portion.

Preferably, the thickness of the sidewall portion at a point at 75% of the tire section height is 1.0 to 1.2 times the thickness of the sidewall potion at the maximum tire section width point. The total of the thicknesses of the inside layer, middle layer and outside layer is not less than 40% of the thickness of the sidewall portion at a point at 75% of the tire section height.

Further, it is preferable that the outer end(s) of at least one, preferably two, more preferably three of the reinforcing rubber layers is(are) disposed in a region beneath a breaker belt. It is preferable that the inner end(s) of at least one, preferably two, more preferably three of the reinforcing rubber layers is(are) disposed in a region radially inward of the maximum tire section width point but radially outward of the radially outside of the bead core. And it is more preferable that both the outer and inner ends of at least one of the reinforcing rubber layers are disposed in the above-mentioned two regions.

BRIEF DESCRIPTION OF THE DRAWINGS

An embodiment of the present invention will now be described in detail in conjunction with the accompanying drawings.

DETAILED DESCRIPTION OF THE INVENTION

Figure 1:
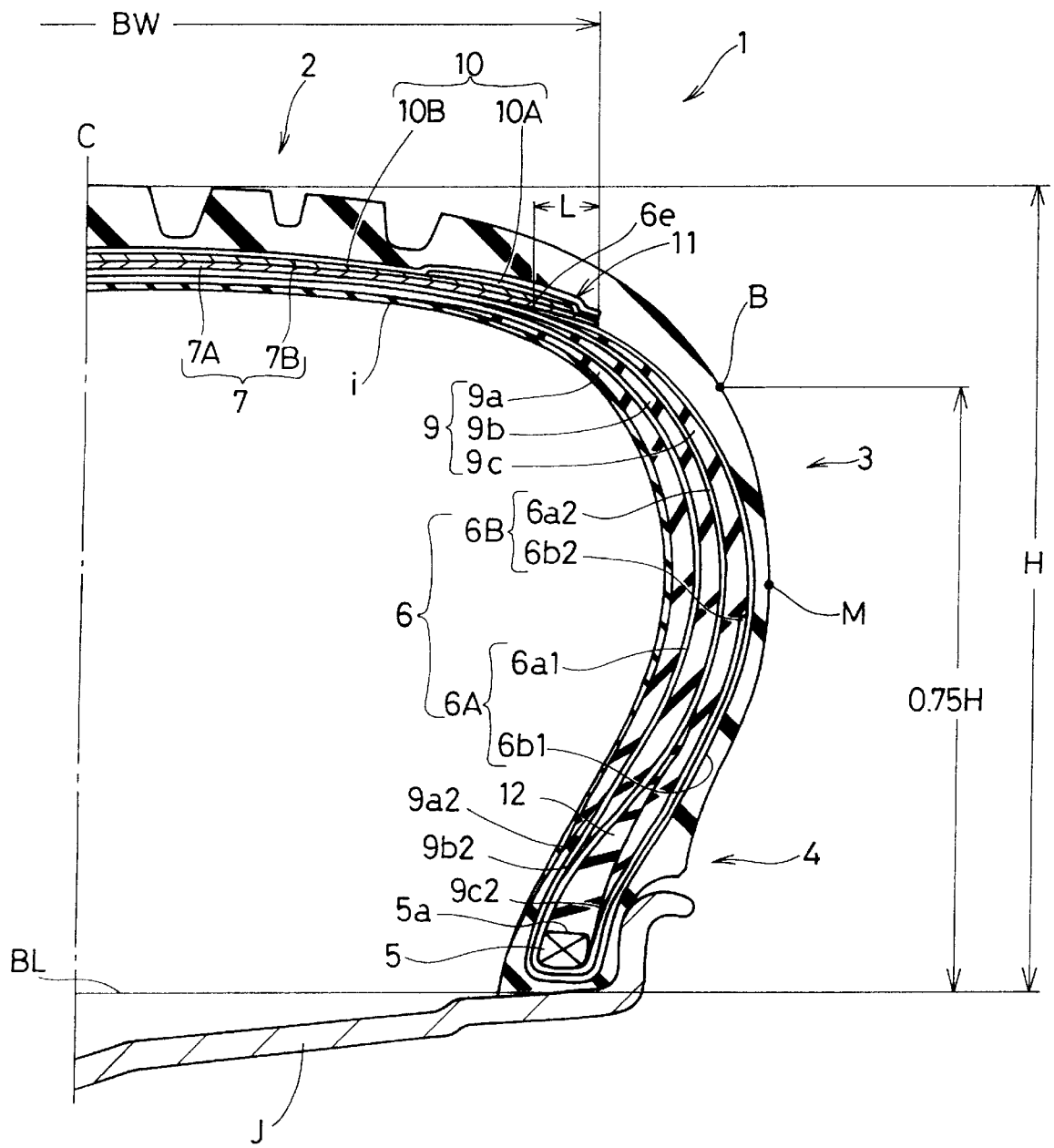
FIG. 1 is a cross sectional view of an embodiment of the present invention.

In the drawings, the run-flat tire 1 according to the present invention comprises a tread portion 2, a pair of sidewall portions 3, a pair of bead portions 4 with a bead core 5 therein, a radial ply carcass 6, a belt 7, 10 disposed radially outside the carcass 6 in the tread portion 2, and sidewall reinforcing layers 9 disposed in each of the sidewall portions 3.

In FIG. 1, the tire 1 is mounted on a standard wheel rim J and inflated to a standard inner pressure but loaded with no tire load. The sizes or dimensions of the tire are measured under this condition if not specifically mentioned. Here, the standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, as the standard pressure, 180 kPa is used.

The carcass 6 comprises an inner ply 6A and an outer ply 6B each made of organic fiber cords. For the organic fiber cords, rayon cords are used in this embodiment, but other materials such as polyester, nylon and the like can be used. The cords of each carcass ply are arranged radially at an angle of 75 to 90 degrees with respect to the tire equator C so that the ply has a radial structure. In this embodiment, the cord angle in each ply is the same value of about 88 degrees but the inclining directions are opposite with respect to the tire equator C. Thus, the cords of one ply cross those of the other ply at a small angle of about 4 degrees in this example.

The belt includes a breaker 7 and a band 10 disposed radially outside the breaker 7.

The breaker 7 comprises two cross plies 7A and 7B, each ply made of parallel cords laid at an angle of from 10 to 35 degrees with respect to the tire equator C. In this embodiment, each ply is made of aramid cords laid at 22 degrees. Aside from the aramid cords, steel cords and the like can be used.

Figure 3:
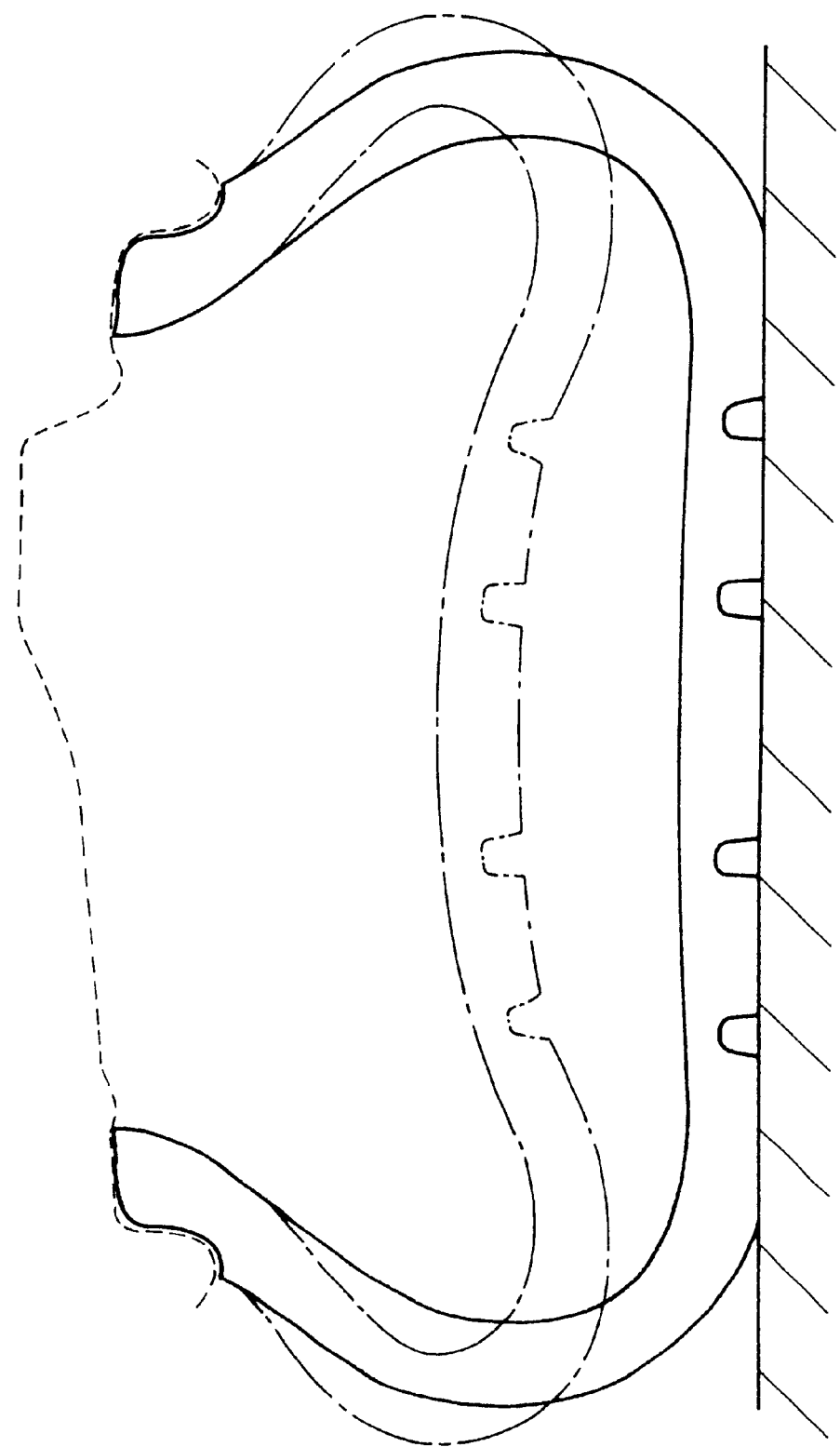
FIG. 3 shows cross sections of the tire under a normal condition and a flat condition obtained by a CT scanner.

The band 10 is made of an organic fiber cord laid substantially parallel with the tire circumferential direction. The band cords have a lower elastic modulus than the breaker cords. In this embodiment, the band 10 is composed of a pair of axially spaced edge-band plies 10A covering the axial edges of the breaker 7 and a full-width band ply 10B disposed radially outside thereof and extending across the substantially full width of the breaker 7. Preferably, each edge-band ply 10A has a width of about 10 to 20% (in this example about 16%) of the axial width BW of the breaker 7. Both the band plies 10A and 10B in this embodiment are formed by spirally winding a tape of rubber, in which parallel nylon cords are embedded along the length thereof. By using such spiral band 10, it becomes possible to effectively prevent ply separation failure even if the tread portion 2 warps as shown in FIG. 3 by chain line. Thus, the durability under run-flat condition can be improved.

According to the present invention, the above-mentioned carcass plies 6A and 6B extend between the bead portions through the tread portion and sidewall portions and turned up around the bead core 5 in each bead portion from the inside to the outside of the tire so that: the carcass ply 6A comprises a pair of turnup portions 6b1 and a main portion 6a1 therebetween; and the carcass ply 6B comprises a pair of turnup portions 6b2 and a main portion 6a2 therebetween.

The edges 6e of the turnup portions 6b1 of the inner ply 6A extend into between the carcass 6 and breaker 7, and the overlap 11 of the turnup portion 6b1 with the breaker 7 has an axial length L of from 3 to 8% (in this embodiment about 6.5%) of the axial width BW of the breaker.

The turnup portion 6b2 of the outer ply 6B has a height of about 0.4 to 0.6 times the tire section height H (in this embodiment about 0.46 times) each from the bead base line BL. This means that the turnup end is positioned around the maximum tire section width point M.

Incidentally, the tire section height H is a radial height measured from the bead base line BL to the radially outermost point. The bead base line is an axial line passing a position corresponding to the rim diameter.

In each of the above-mentioned bead portions 4, a bead apex 12 is disposed between the turnup portion 6b2 and main portion 6a2 of the outer carcass ply 6B. The bead apex 12 is made of a hard rubber and extends and tapers radially outwardly from the outside 5a of the bead core 5.

The above-mentioned sidewall reinforcing layers 9 include: an inside reinforcing rubber layer 9a disposed between the main portion 6a1 of the inner ply 6A and an air tight inner liner (i) disposed along the inside of the tire; a middle reinforcing rubber layer 9b disposed between the main portions 6a1 and 6a2 of the inner and outer plies 6A and 6B; and an outside reinforcing rubber layer 9c disposed between the main portion 6a2 of the outer ply 6B and the turnup portions 6b1 and 6b2. Each of the reinforcing rubber layers 9a–9c tapers radially inwardly and radially outwardly.

Figure 2:
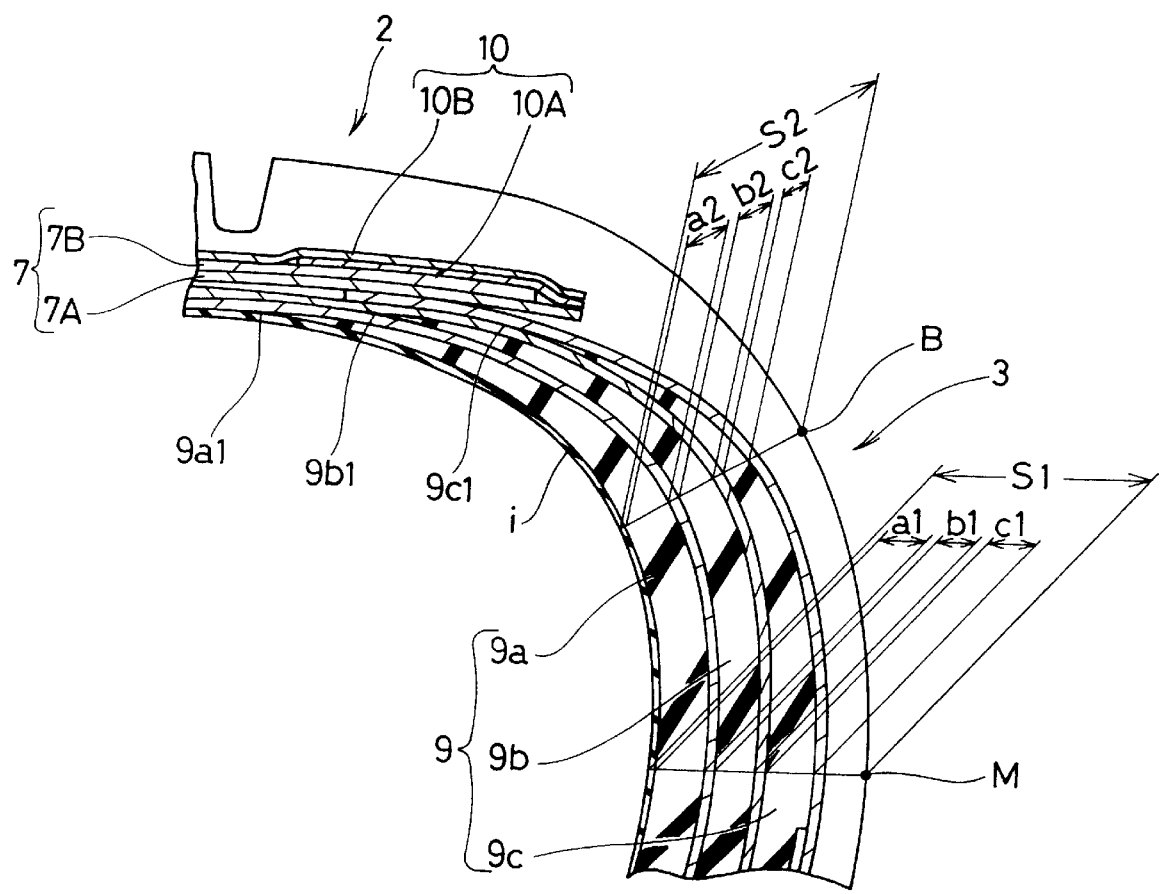
FIG. 2 is an enlarged cross sectional view of a shoulder portion thereof.

In this embodiment, each layer (9a, 9b, 9c) has a radially outer end (9a1, 9b1, 9c1) located beneath or radially inward of the breaker 7 as shown in FIG. 2, and a radially inner end (9a2, 9b2, 9c2) located radially inside the maximum tire section width point M but radially outside the outer end 5a of the bead core 5.

The outer ends 9a1, 9b1 and 9c1 are placed at different axial positions so that the total thickness of the layers gradually changes from the tread portion 2 to the sidewall portion 3. In this embodiment, the outer end 9a1 is inmost, and the outer end 9c1 is outmost. Thus, the outer end 9b1 is middle.

At least one of the radially inner ends 9a2, 9b2 and 9c2 of the reinforce rubber layers 9a, 9b and 9c is positioned radially inward of the maximum tire section width point M. None of the radially inner ends 9a2, 9b2 and 9c2 is positioned radially inward of the outer end 5a of the bead core 5.

In this embodiment shown in FIG. 1, the radially inner tapered portion of the outside layer 9c and the radially outer tapered portion of the bead apex 12 are spliced, and in this spliced portion, the outside layer 9c is positioned axially outside the bead apex 12. And the radially inner end 9c2 thereof reaches near the radially outside of the bead core 5.

On the other hand, the radially inner ends 9b2 and 9a2 of the middle and inside layers 9b and 9a reach to radially different positions which are radially inward of the radially outer end of the bead apex 12 but radially outward of the radially out end 5a of the bead core 5.

As shown in FIG. 2, the total thickness of the sidewall portion 3 is such that the total thickness S2 at a point B is set in the range of from 1.0 to 1.4 times, preferably more than 1.0 times but not more than 1.4 times, more preferably more than 1.0 times but not more than 1.2 times, still more preferably 1.1 to 1.2 times the total thickness S1 at the maximum tire section width point M.

The point B is a point on the outer surface of the tire at a radial height of 75% of the tire section height H. The total thickness S1, S2 is measured along the normal direction to the outer surface or profile of the tire.

At the maximum tire section width point M, the total (a1+b1+c1) of the thicknesses a1, b1 and c1 of the layers 9a, 9b and 9c, respectively, is set to be not less than 50%, preferably 50 to 70%, more preferably 50 to 65%, still more preferably 55 to 65% of the total thickness S1.

Further, at the above-mentioned point B, the total (a2+b2+c2) of the thicknesses a2, b2 and c2 of the layers 9a, 9b and 9c, respectively, is set to be not less than 40%, preferably 45 to 60% of the total thickness S2.

Preferably, the total (a2+b2+c2) is smaller than the total (a1+b1+c1).

At the maximum tire section width point M, it is preferable that the layers 9a, 9b and 9c are the substantially same thickness (a1=b1=c1). But, the following relationships may be possible: a1<b1<c1 ; a1>b1>c1 ; a1>b1<c1 ; a1<b1>c1.

Each of the reinforcing rubber layers 9 is made of a rubber compound of low-heat-generation having a complex elastic modulus E* of from 7.0 to 12.0 MPa and a loss tangent (tan δ) of not more than 0.02, preferably not more than 0.01, more preferably in the range of from 0.008 to 0.001.

In this embodiment, all the layers 9a, 9b and 9c are made of the same rubber compound.

But it is also possible to use different rubber compounds which satisfy

E*a>E*b>E*c or

E*a<E*b<E*c or

E*a<E*b>E*c or

E*a>E*b<E*c, wherein E*a, E*b and E*c are the complex elastic moduli of the layers 9a, 9b and 9c, respectively.

If the complex elastic modulus E* is outside the range of from 7.0 to 12.0 MPa, the bending rigidity of the sidewall portion 3 tends to decrease and heat generation increasaes and ride comfort deteriorates.

If the loss tangent (tan δ) is more than 0.02, heat generation increases and the sidewall is liable to be broken by built-up heat.

The above-mentioned complex elastic modulus E* and loss tangent (tan δ) were measured under the following conditions using a viscoelastic spectrometer of IWAMOTO SEISAKUSYO in Japan.

Temperature: 70 degrees C

Frequency: 10 Hz

Dynamic distortion: plus/minus 2%

Size of specimen: 4 mm×30 mm×1.5 mm

Comparison Test

Test tires of size 225/60R16 were made by way of test and tested for run-flat performance. The specifications of the tires and test results are shown in Table 1.

Run-flat performance test: Test tires were mounted on the front and rear wheels of a test car (Japanese 3000cc FR passenger car), and an air valve core was removed from the front right tire. Then, a runable distance or running distance until the tire was broken was measured in a test circuit course under the following conditions.

Running speed: 100 km/h (straight),
   50 km/h (150R and 110R corners)

Rim size: 16×7JJ (standard rim)

Tire load: 580 kgf

The results are indicated by an index based on Prior Art tire being 100. The larger the index, the longer the runable distance.

From the test results, it was confirmed that the Example tires were remarkably increased in runable distance although the tire weight is maintained at the same level as the Prior Art tire.

FIG. 3 shows cross-sections of Embodiment tire when loaded with 4.41 kN under a normally inflated condition (solid line) and a flat condition (chain line). This shows that even when the tire is punctured the Embodiment tire can endure its load without touching the inner surface itself.

TABLE 1

Figure 4:
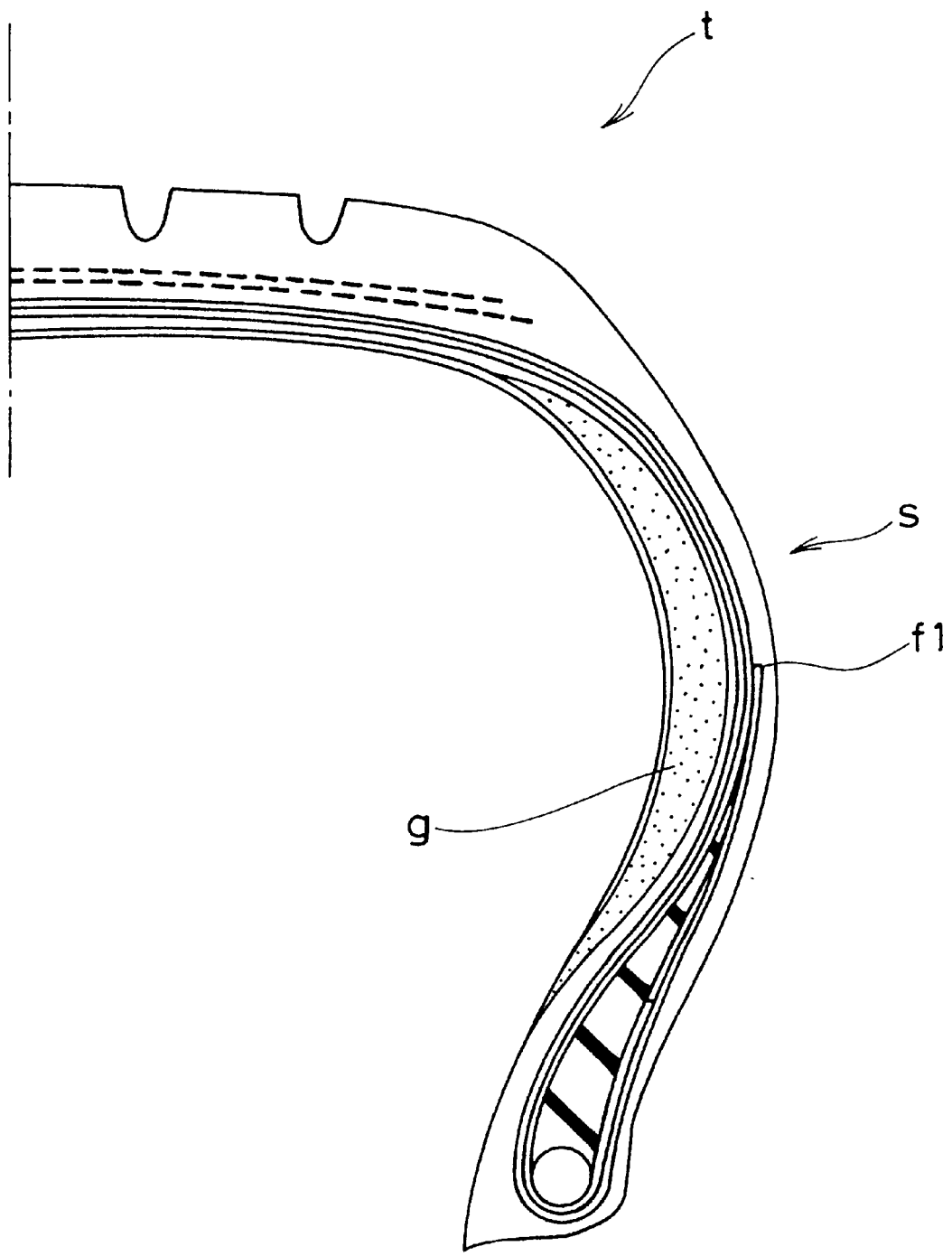
FIG. 4 is a cross sectional view of a prior art tire.

| Tire | Prior FIG. 4 | Ex. 1 FIG. 1 | Ex. 2 FIG. 1 | Ref. FIG. 1 | Ex. 3 FIG. 1 | Ex. 4 FIG. 1 |
|---|---|---|---|---|---|---|
| Carcass cord | rayon 1840 dtex/2 | | | | | |
| Breaker cord | aramid 1670 dtex/2 | | | | | |
| Band cord | nylon 1400 dtex/2 | | | | | |

TABLE 1-continued

| Tire | Prior FIG. 4 | Ex. 1 FIG. 1 | Ex. 2 FIG. 1 | Ref. FIG. 1 | Ex. 3 FIG. 1 | Ex. 4 FIG. 1 |
|---|---|---|---|---|---|---|
| Reinforcing rubber layers | | | | | | |
| Complex elastic modulus | 9.2 MPa | inside = middle = outside = 9.2 MPa | | | | |
| Loss tangent | 0.005 | inside = middle = outside = 0.005 | | | | |
| S1 (mm) | 20 | 18 | 18 | 15 | 18 | 18 |
| a1 + b1 + c1 (mm) | — | 10 | 10 | 7 | 10 | 10 |
| (a1 + b1 + c1)/S1 | — | 0.56 | 0.56 | 0.46 | 0.56 | 0.56 |
| S2 (mm) | 18 | 20 | 17 | 17 | 20 | 24 |
| a2 + b2 + c2 (mm) | — | 9 | 7 | 7 | 7 | 12 |
| (a2 + b2 + c2)/S2 | — | 0.45 | 0.41 | 0.41 | 0.35 | 0.5 |
| S2/S1 | 0.9 | 1.11 | 0.94 | 1.13 | 1.11 | 1.33 |
| Run-flat performance | 100 | 300 | 100 | 50 | 150 | 400 |
| Tire weight | 100 | 100 | 95 | 80 | 100 | 110 |

What is claimed is:

1. A run-flat tire comprising a tread portion, a pair of sidewall portions, a pair of bead portions with a bead core therein, a carcass comprising an inner ply and an outer ply each made of organic fiber cords, a belt disposed radially outside the carcass in the tread portion, sidewall reinforcing rubber layers disposed in each said sidewall portion, each of the inner ply and outer ply extending between the bead portions through the tread portion and sidewall portions and turned up around the bead core in each said bead portion from the inside to the outside of the tire to form a pair of turnip portions and a main portion therebetween, the turnip portions of the inner ply extended into between the belt and the carcass and each having a radially outer end secured therebetween, said sidewall reinforcing rubber layers including:
   an inside layer disposed axially inside the main portion of the inner ply;
   a middle layer disposed between the main portion of the inner ply and the main portion of the outer ply; and
   an outside layer disposed axially outside the main portion of the outer ply, at least one of the sidewall reinforcing rubber layers having a radially outer end located beneath the belt, at least one of the sidewall reinforcing rubber layers having a radially inner end located radially outward of the bead core but radially inward of a maximum tire section width point measured when the tire is mounted on a standard rim and inflated to a standard inner pressure but loaded with no tire load, at the maximum tire section width point, the total (a1+b1+c1) of the thickness a1 of the inside layer, the thickness b1 of the middle layer, and the thickness c1 of the outside layer being not less than 0.5 times the thickness S1 of the sidewall portion.

2. The run-flat tire according to claim 1, wherein
the total of the thicknesses of the inside layer, middle layer and outside layer is not less than 40% of the thickness S2 of the sidewall portion at a point at 75% of the tire section height measured when the tire is mounted on a standard rim and inflated to a standard inner pressure but loaded with no tire load.

3. The run-flat tire according to claim 1, wherein
the thickness S2 of the sidewall portion at a point at 75% of the tire section height measured when the tire is mounted on a standard rim and inflated to a standard inner pressure but loaded with no tire load is 1.0 to 1.2 times the thickness S1 of the sidewall portion at the maximum tire section width point.

4. The run-flat tire according to claim 3, wherein the total of the thicknesses of the inside layer, middle layer and outside layer is not less than 40% of the thickness S2 of the sidewall portion at a point at 75% of the tire section height.

5. The run-flat tire according to claim 1, wherein
the radially outer ends of the inside, middle and outside layers are located beneath the belt.

6. The run-flat tire according to claim 1, wherein
the radially inner ends of the inside, middle and outside layers are located radially inward of the maximum tire section width point but radially outward of the bead core.

* * * * *